(12) United States Patent
Chandrasekhar et al.

(10) Patent No.: US 8,299,159 B2
(45) Date of Patent: Oct. 30, 2012

(54) HIGHLY THERMALLY-CONDUCTIVE MOLDABLE THERMOPLASTIC COMPOSITES AND COMPOSITIONS

(75) Inventors: Bukkinakere Kapanipathaiya Chandrasekhar, Bangalore (IN); Manjunatha Hosahalli Ramachandraiah, Bangalore Rural District (IN); Bambore Lokeshwarappa Santhosh Kumar, Chitradurga (IN); Srinivasan Duraiswamy, Bangalore (IN)

(73) Assignee: Laird Technologies, Inc., Chesterfield, MO (US)

( * ) Notice: Subject to any disclaimer, the term of this patent is extended or adjusted under 35 U.S.C. 154(b) by 254 days.

(21) Appl. No.: 12/773,422

(22) Filed: May 4, 2010

(65) Prior Publication Data
US 2011/0040007 A1 Feb. 17, 2011

(30) Foreign Application Priority Data
Aug. 17, 2009 (IN) .......................... 1891/MUM/2009

(51) Int. Cl.
C08K 3/38 (2006.01)
C08K 3/22 (2006.01)
(52) U.S. Cl. ........ 524/404; 524/440; 524/428; 524/433; 977/742
(58) Field of Classification Search .................. 524/404, 524/440, 428, 433; 977/742
See application file for complete search history.

(56) References Cited

U.S. PATENT DOCUMENTS

| | | | |
|---|---|---|---|
| 4,716,081 A | 12/1987 | Ehrreich | |
| 6,048,919 A | 4/2000 | McCullough | |
| 6,162,849 A | 12/2000 | Zhuo et al. | |
| 6,241,914 B1 | 6/2001 | Schleifstein | |
| 6,487,073 B2 | 11/2002 | McCullough et al. | |
| 6,620,497 B2 | 9/2003 | Smith et al. | |
| 6,685,855 B1 | 2/2004 | Miller et al. | |
| 6,827,470 B2 | 12/2004 | Sagal et al. | |
| 6,835,347 B2 | 12/2004 | McCullough et al. | |
| 6,868,602 B2 | 3/2005 | McCullough | |
| 6,995,205 B2 | 2/2006 | Matsukawa et al. | |
| 7,235,918 B2 | 6/2007 | McCullough et al. | |
| 7,365,121 B2 | 4/2008 | Huang et al. | |
| 7,419,270 B2 | 9/2008 | Kawai | |
| 7,462,309 B2 | 12/2008 | Miller et al. | |
| 7,553,908 B1 | 6/2009 | Cosman et al. | |
| 2002/0160193 A1* | 10/2002 | Hajmrle et al. ............... | 428/403 |
| 2005/0224764 A1 | 10/2005 | Ma et al. | |
| 2006/0043346 A1 | 3/2006 | Kodas et al. | |
| 2007/0045823 A1 | 3/2007 | Miller | |
| 2010/0276630 A1 | 11/2010 | Chandrasekhar et al. | |

FOREIGN PATENT DOCUMENTS

| | | |
|---|---|---|
| EP | 2195374 | 6/2010 |
| GB | 2 198 734 A * | 6/1988 |
| GB | 2198734 | 6/1988 |
| JP | 62027458 | 2/1987 |
| JP | 06-005115 | 1/1994 |
| JP | 2005298653 | 10/2005 |
| JP | 2007099798 | 4/2007 |
| JP | 2010-261040 | 11/2010 |
| WO | WO 01/20618 | 3/2001 |
| WO | WO 2008/021768 | 2/2008 |
| WO | WO 2008/056123 | 5/2008 |
| WO | WO2008/078848 | 7/2008 |
| WO | WO2008/079438 | 7/2008 |
| WO | WO 2009/035453 | 3/2009 |

OTHER PUBLICATIONS

European Search Report dated Jul. 27, 2010, for European Patent Application No. EP 10163699 which is related to the instant application through a priority claim; 9 pages.
Database WPI Week 200749 Thompson Scientific, London, GB; AN 2007-501158 XP002593869 C:/EPOPROGS/SEA\.\..\.\epo-data\sea\eplogf\internal.log; accessed Aug. 2, 2010; 3 pages.
Database WPI Week 200579 Thompson Scientific, London, GB; AN 2005-773548 XP002593807 C:/EPOPROGS/SEA\.\..\. \epodata\sea\eplogf\internal.log; accessed Aug. 2, 2010; 2 pages.
Using a Carbon Nanotube Additive to Make Electrically Conductive Commercial Polymer Composites, Marmi Rutkofsky et al., Zyvex Application Note 9709, 2006, 3 pages.
High-Conductivity Polymer Nanocomposites Obtained by Tailoring the Characteristics of Carbon Nanotube Fillers, Nadia Grossiod et al., 2008 Advanced Function Materials, www.afm-journal.de, pp. 3226-3234.
Conductive High Temperature Nylon, Julia A. King et al., Journal of Composite Materials, vol. 34, No. 24, pp. 2038-2060 (2000).
International Search Report from PCT/US2007/078334, published as WO 2009/035453, 2 pages, dated Jun. 11, 2008.
Japanese office action from co-pending Japanese patent application No. 2010-123935 dated Feb. 14, 2012; 8 pages. The instant application and Japanese patent application No. 2010-123935 both claim priority to India patent application No. 1891/MUM/2009.

* cited by examiner

Primary Examiner — Robert D. Harlan
(74) Attorney, Agent, or Firm — Harness, Dickey & Pierce, P.L.C.

(57) ABSTRACT

Thermally-conductive moldable thermoplastic compositions or composites may generally include a plurality of metal-coated filler particles; a plurality of secondary filler particles; and a polymer matrix in admixture with the metal-coated filler particles and the secondary filler particles. The composition or composite may have a thermal conductivity ranging from about 20 Watts per meter-Kelvin to about 35 Watts per meter-Kelvin. Injection molded articles having a moldable thermally-conductive thermoplastic composition or composite can be formed for microelectronics, automotive, avionic, and other heat dissipation applications.

27 Claims, 1 Drawing Sheet

HIGHLY THERMALLY-CONDUCTIVE MOLDABLE THERMOPLASTIC COMPOSITES AND COMPOSITIONS

CROSS-REFERENCE TO RELATED APPLICATION

This application claims priority to India Patent Application No. 1891/MUM/2009 filed Aug. 17, 2009. The entire disclosure of the above application is incorporated herein by reference.

FIELD

The present disclosure relates to moldable thermally-conductive thermoplastic composites and compositions for electrical and electronic devices.

BACKGROUND

This section provides background information related to the present disclosure which is not necessarily prior art.

Thermal conductivity of a polymer composite is governed by filler—matrix compatibility, filler size, shape, their synergetic effects, and the processability apart from filler content. In various macro and microfabrication industries such as heat sink industries and microelectronic products, e.g. light emitting diode ("LED") manufacture, it has been well known to employ metallic materials for thermal conductivity applications, such as for heat dissipation, for cooling semi-conductor containing devices, e.g. computers, solar panels, and the like. For these applications, such as heat sinks, the metallic material typically is tooled or machined from bulk metals into desired configurations. But such metallic conductive articles are typically very heavy, costly to manufacture and are susceptible to corrosion. Further, the geometries of machined metal heat dissipating devices are very limited to the inherent limitations associated with machining or tooling techniques. With respect to microelectronic devices, they too may require heat dissipation in order to provide functional semi-conducting processes. The trend to miniaturize various electronic components requires that heat sink components follow such miniaturization trends to provide aesthetic appeal of certain smaller form factors. Because of the smaller dimensions of the packaging, the heat dissipation characteristics of small microelectronic devices are degraded, which, in turn, may lead to the degradation of the device's performance, erratic behavior, a shortened life span, and other possible undesirable consequences. Many applications also require thermally conducting and electrically insulating applications for which metals are not suitable.

To address the above problems associated with the use of metallic machined parts used for thermal dissipation, attempts have been made to provide molded compositions that include a conductive filler therein to provide the necessary thermal conductivity function. Since the filler binder portion of the composite material is generally non-conductive, there have been problems associated with providing composite materials having a high percentage of filler particles such as greater than 55% by volume, due to reasons primarily associated with filler aggregation.

In thermally-conductive polymer composites, high thermal conductivity values greater than 10 Watts per meter Kelvin (W/m·K) can be achieved typically at higher loadings greater than 60 percent of fillers. Lack of suitable fillers, their synergetic effects and processability, limit the thermal conductivity of the commercially available polymer composites known to date to less than 20 Watts per meter Kelvin. The inventors hereof have recognized a need for moldable thermally-conductive composite materials that exhibit thermal conductivity higher than 20 Watts per meter Kelvin while being easily moldable, including injection molding, for complex and miniature geometries while being relatively low in cost to manufacture.

SUMMARY

This section provides a general summary of the disclosure, and is not a comprehensive disclosure of its full scope or all of its features.

In one aspect, exemplary embodiments are provided of moldable thermally-conductive thermoplastic composites or compositions that generally include a plurality of metal-coated filler particles; a plurality of secondary filler particles; and a polymer matrix in admixture with the metal-coated filler particles and the secondary filler particles.

In a further aspect, exemplary embodiments of the present technology provide embodiments of moldable thermally-conductive thermoplastic composites or compositions that generally include a polymer matrix admixed with metal containing filler particles, which may include metal-coated graphite, metal-coated perlite with one or more metal coatings, and combinations thereof. The moldable thermally-conductive thermoplastic composite or composition may have a thermal conductivity greater than 20 Watts per meter Kelvin.

Articles that include a metal-coated filler, a secondary filler, and a polymer matrix disclosed herein and/or that are produced by methods disclosed herein may include thermally and/or electrically conductive articles, such as tapes, polymeric films, polymer composites, heat sinks, articles comprising heat sinks, highly thermally-conductive injection moldable thermoplastic composites, highly electrically conductive injection moldable thermoplastic composites, etc.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
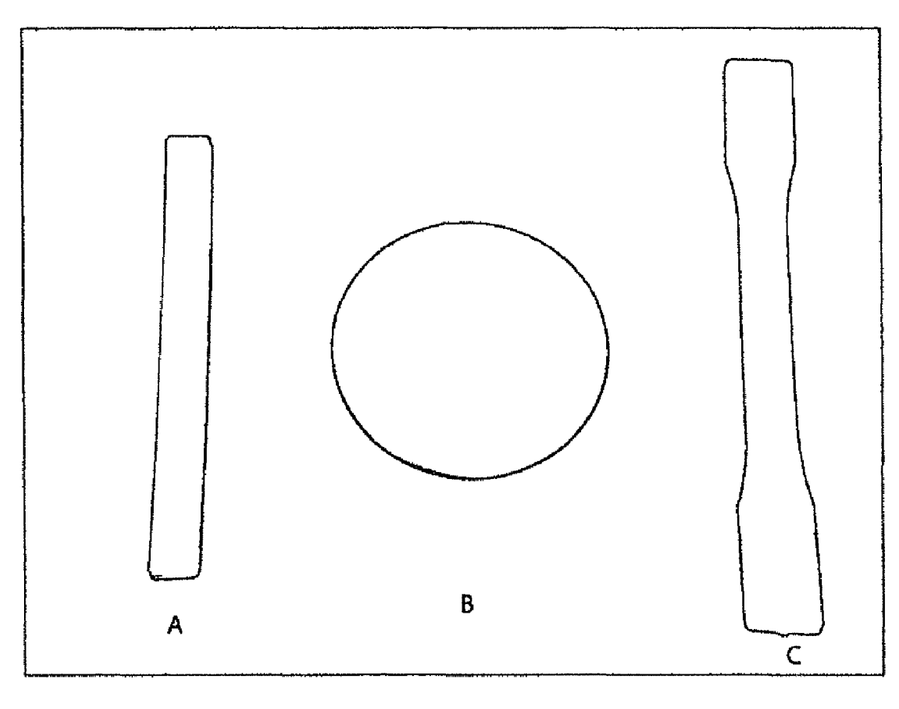
FIG. 1 depicts a photograph of three different injection molded objects including specimen A (a rectangular bar for impact testing), specimen B (a circular disc for thermal conductivity measurement) and specimen C (a dog-bone shaped sample for strength measurement). All three specimens include the composition described in Example 6 below, including silver coated graphite, silver coated perlite, and liquid crystal polymer.

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing there-from. The following definitions and non-limiting guidelines must be considered in reviewing the description of the technology set forth herein.

The headings (such as "Background" and "Summary") and sub-headings used herein are intended only for general organization of topics within the present technology, and are not intended to limit the disclosure of the present technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. Any discussion of the content of references cited in the Background is intended merely to provide a general summary of assertions made by the authors of the references, and does not constitute an admission as to the accuracy of the content of such references. All references cited in the "Description" section of this specification are hereby incorporated by reference in their entirety.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

As used herein, the words "preferred" and "preferably" refer to embodiments of the technology that afford certain benefits, under certain circumstances. But other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "comprise", "include," and variants thereof are intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting ingredients, components or process steps, Applicants specifically envision embodiments consisting of, or consisting essentially of, such ingredients, components or processes excluding additional ingredients, components or processes (for consisting of) and excluding additional ingredients, components or processes affecting the novel properties of the embodiment (for consisting essentially of), even though such additional ingredients, components or processes are not explicitly recited in this application. For example, recitation of a composition or process reciting elements A, B, and C specifically envisions embodiments consisting of, and consisting essentially of, A, B, and C, excluding an element D that may be recited in the art, even though element D is not explicitly described as being excluded herein.

The present technology builds on and increases the efficiencies of carrier systems coated with metal particles for thermally-conductive applications. For example, some embodiments of the present technology provide carrier systems having improved uniformity of metal particle distribution throughout a matrix. Embodiments of the present technology provide metal-coated fillers including a plurality of one or more of metal-coated graphite particles (e.g., silver-coated graphite particles, etc.), metal-coated perlite particles (e.g., perlite particles having one or more metal coatings, silver-coated copper-coated perlite particles, etc.), or combinations thereof. A plurality of secondary filler particles may also be provided. The metal-coated fillers and secondary filler particles are mixed in a polymer matrix. As noted above, the inventors hereof have recognized that high loading of fillers is difficult to achieve in view of enhanced viscosities during processing, such as injection molding. Further, the inventors have recognized that differences in densities lead to segregation resulting in heterogeneity. Both these problems may be overcome in exemplary embodiments of the present technology disclosed herein, such as by combining one or more types of metal-coated fillers with secondary fillers in admixture with a compatible polymer matrix for use in molding applications, for example, injection molding.

The ability of a thermal management material to dissipate heat is determined by its thermal conductivity. Thermal conductivity (k) is one of the basic thermophysical properties which determine the heat flux and the resulting temperature field in a device configuration, subject to boundary conditions. Thermal conductivity (K) in Watts per meter Kelvin (W/m·K) is defined as:

k is calculated by the formula: $k = \rho \times Cp \times \alpha$ (and expressed as W/m·K)  Equation (I)

where α is the thermal diffusivity (cm$^2$/s), ρ is the density (Kg/cm$^3$) and Cp is the heat capacity (J/(kg·K)) of the material.

The present technology builds on and increases the efficiencies of moldable thermally-conductive thermoplastic composite for modern injection molding applications comprising metal-coated filler particles for thermally-conductive and electrically-conductive applications. For example, some embodiments of the present technology provide moldable thermally-conductive thermoplastic composite having improved uniformity and high yield of metal-coated particle distribution throughout a polymer matrix enabling thermal conductivities ranging from about 10 Watts per meter Kelvin to about 35 Watts per meter Kelvin (W/m·K).

Exemplary embodiments of the present technology provide moldable thermally-conductive thermoplastic composites comprising a metal-coated filler including one or more of metal-coated graphite (e.g., silver-coated graphite particles, etc.), metal-coated perlite (e.g., perlite particles having one or more metal coatings, etc.), or combinations of metal-coated graphite and metal-coated perlite. Various embodiments include perlite particles having at least first and second metal coatings (which is also referred to herein as metal-coated metal-coated perlite particles), such as silver-coated copper-coated perlite particles, etc. The thermally-conductive thermoplastic composites may also include a secondary filler, such as one or more of carbon fiber, boron nitride, graphite, nano graphite platelets, carbon nanotubes, carbon black, boron nitride, silicon nitride, aluminum nitride, aluminum oxide, magnesium oxide, and combinations thereof. The metal-coated filler and secondary filler are dispersed and mixed in a polymer matrix that includes one or more thermoplastic materials and/or thermoplastic elastomers. Non-limiting, illustrative examples of thermoplastic materials useful in the present technology can include: polycarbonate; acrylonitrile butadiene styrene (ABS) (chemical formula $(C_8H_8 \cdot C_4H_6 \cdot C_3H_3N)_n$); polycarbonate/acrylonitrile butadiene styrene alloys (PC-ABS); polyphenylene sulfide (PPS); polyphenylene ether; modified polyphenylene ether containing polystyrene; liquid crystal polymers; polystyrene; styrene-acrylonitrile copolymer; rubber-reinforced polystyrene; acrylic resins such as polymers and copolymers of alkyl esters of acrylic and methacrylic acid; styrene-methyl methacrylate copolymer; styrene-methyl methacrylate-butadiene copolymer; polymethyl methacrylate; methyl methacrylate-styrene copolymer; polyvinyl acetate; polysulfone; polyether sulfone; polyether imide; polyarylate; polyamideimide; polyvinyl chloride; vinyl chloride-ethylene copolymer; vinyl chloride-vinyl acetate copolymer; polyimides, polyamides; polyolefins such as polyethylene; ultra high molecular weight polyethylene; high density polyethylene; linear low density polyethylene; polyethylene napthalate; polyethylene terephthalate; polypropylene; chlorinated polyethylene; ethylene acrylic acid copolymers; polyamides such as nylon 6, nylon 6,6, and the like; phenylene oxide resins; phenylene sulfide resins; polyoxymethylenes; polyesters; polyvinyl chloride; vinylidene chloride/vinyl chloride resins; and vinyl aromatic resins such as polystyrene; poly(vinylnaphthalene); and poly(vinyltoluene); polyamides; polyimides; polyaryletheretherketone; polyphthalamide; polyetheretherketones; polyaryletherketone and combinations thereof.

Admixing the thermally-conductive metal-coated filler and/or secondary filler in a polymer matrix will render the composite thermally-conductive while permitting the material to be moldable, for example, injection moldable. When employed as a thermal conductor, the thermally-conductive thermoplastic composites may be operable to thermally transfer heat from the bulk of the material. During this thermal transfer, heat may travel from heat conductive filler member to the adjacent heat conductive filler member to travel the path from one surface of the composite to another. The present inventors have discovered a synergistic combination of suitable metal-coated fillers and secondary fillers in admixture with a suitable polymer matrix. The present thermoplastic composite advantageously provides enhanced processability and overrides previous limits of thermal conductivity found in prior art composites which were limited to less than 20 Watts per meter-Kelvin.

Moldable Thermally-Conductive Thermoplastic Composites

Embodiments of the present technology provide a moldable thermally-conductive thermoplastic composite comprising: a plurality of metal-coated filler particles; a plurality of secondary filler particles; and a polymer matrix in admixture with the metal-coated filler particles and the secondary filler particles. In various embodiments, the amount of metal-coated filler particles and secondary filler particles in the total composite can range from about 40% to about 80% of the total volume of the composite. In some embodiments, the amount of metal-coated filler particles and secondary filler particles in the total composite combined can range from about 40% to about 50%, from about 40% to about 60%, or from about 40% to about 70% or from about 40% to about 75%, or from about 50% to about 70%, or from 40% to about 80% of the total composite volume. The moldable thermally-conductive thermoplastic composite of the present technology can be molded and finished into a final product having a thermal conductivity ranging from about 10 Watts per meter-Kelvin to about 35 Watts per meter-Kelvin.

Metal-Coated Fillers

In various embodiments of the present technology, the moldable thermally-conductive thermoplastic composite contains at least one metal-coated filler. The metal-coated filler can include silver coated graphite, metal-coated perlite filler particles, and combinations thereof. In some embodiments, the metal-coated perlite particles can include single metal-coated perlite particles, for example, silver coated perlite filler particles. In addition, metal-coated filler particles can also include, in non-limiting examples, metal-coated metal-coated perlite particles, e.g., a second metal coated on an expanded perlite particle coated with a first metal on the surface and within pores of the expanded perlite particle. In various embodiments, the thermally-conductive thermoplastic composite can incorporate by volume of the total composite, a metal-coated filler in an amount that can range from 10% to about 80%, or from about 20% to about 80%, or from about 30% to about 80%, or from about 40% to about 80%, or from about 50% to about 80%, or from about 60% to about 80%, or from about 10% to about 50%, or from about 10% to about 40%, or from about 10% to about 30% or from about 10% to about 20% by volume of the thermally-conductive thermoplastic composite.

Silver Coated Graphite

Silver coated graphite particles can be manufactured using any known process. In some embodiments, silver-coated graphite particles can be made by electroplating techniques, by chemical reduction of a silver salt solution onto graphite particles and the like. The particle size for the graphite may range from about 5 microns to about 500 microns. Silver coated graphite particles can be dried and in a powdered form to be mixed with the polymer matrix. The amount of silver coated graphite if incorporated into the thermally-conductive thermoplastic composite can range, from about 5% to about 80% volume/volume of the total composite. In some embodiments, the amount of silver coated graphite if incorporated into the thermally-conductive thermoplastic composite can range, from about 25% to about 60% volume/volume of the total composite. In some embodiments of the present technology, silver coated graphite can include graphite commercially available as Thermocarb® TC-300 manufactured by Asbury Graphite Mills Inc; (Asbury, N.J., USA). The graphite can be coated with metal silver particles with a loading of 5-15% by weight (to that of graphite). The typical volume percentage of silver coated graphite which can be used in the composite can range from about 40% to about 70%. The particle size distribution of the silver coated graphite particles can range from less than 44 microns to 600 microns or larger, or from about 44 microns to about 600 microns. An exemplary thermal conductivity of the graphite material used to make the silver coated graphite particles can include 600 Watts per meter-Kelvin or higher at room temperature in the 'a' direction.

Metal-Coated Metal-Coated Perlite Filler

In some embodiments, the moldable thermally-conductive thermoplastic composite can include a metal-coated filler having a second metal coated onto a first metal-coated perlite particle (which may also be generally referred to herein as metal-coated metal-coated perlite particle). The metals which are used to coat the first metal-coated perlite filler particles, and the perlite filler particles themselves, can include any one or more of metal particles of the Groups 8-12 (IUPAC) or Groups VIIIB, IB and IIB (CAS) of the periodic table. Such metals can include gold, silver, platinum, copper, iron, palladium, cobalt, palladium, nickel, aluminum, zinc, and alloys thereof. The metallic salt solutions used to coat the perlite particles and the metal-coated perlite particles may contain metal-containing cations, such as $Cu^+$, $Cu^{2+}$, $[Cu(NH_3)_4]^{2+}$, $Ni^{2+}$, $Pd^{2+}$, $Pt^{2+}$, $Au^+$, $Au^{3+}$, $Zn^{2+}$, $Co^{2+}$, $Co^{3+}$, $Ag^+$, $Al^{3+}$, $Cd^{2+}$, $Fe^{2+}$, and $Fe^{3+}$. The metallic salt solution can comprise the aforementioned metal cation or combination of metal cations with anionic species that are part of simple anions, oxoanions, and organic acid anions. The metal cations can be in the form of aqueous or non aqueous solutions. In some embodiments, the anion species which form the metallic salt can include: $Cl^-$, $OH^-$, $NO_3^-$, $NO_2^-$, $PO_4^{3-}$, $PO_3^{3-}$, $HPO_4^{2-}$, $H_2PO_4^-$, $MnO_4^-$, $SO_4^{2-}$, $SO_3^{2-}$, $CO_3^{2-}$, $CrO_4^{2-}$, $HCO_2^-$, $C_2H_3O_2^-$ and $C_2O_4^{2-}$. Preferably, the anion is a nitrate, an acetate, or a phosphate.

Perlite, which may be used in some embodiments of the present technology, includes expanded perlite derived from perlite ore (which belongs to the class of natural glasses) commonly referred to as volcanic glasses (which are formed by the rapid cooling of siliceous magma and lava). Perlite ore is a hydrated natural glass containing typically about 72 to 75 percent $SiO_2$, 12 to 14 percent $Al_2O_3$, 0.5 to 2 percent $Fe_2O_3$, 3 to 5 percent $Na_2O$, 4 to 5 percent $K_2O$, 0.4 to 1.5 percent CaO (by weight) and small concentrations of MgO, $TiO_2$ and other metallic constituents. Perlite ore is distinguished from other natural glasses by a higher content (2 to 10 percent by weight) of chemically bonded water, the presence of a vitreous, pearly luster, and characteristic concentric or arcuate onion skin-like (perlitic) fractures. In some embodiments, the perlite particles can include expanded perlite particles coated with one or more metals. In other embodiments, the expanded perlite particles can be porous. In some embodiments, the porosity of the porous perlite particles can range from about 40% to about 99% of the total volume of the particle. In some embodiments, the porosity can range from about 45% to about 99%, or from about 50% to about 99%, or from about 55% to about 99%, or from about 60% to about 99%, or from about 65% to about 99%, or from about 70% to about 99%, or from about 75% to about 99%, or from about 80% to about 90%, or from about 85% to about 99%, or from about 90% to about 99%, or from about 40% to about 85%, or from about 40% to about 80%, or from about 40% to about 75%, or from about 40% to about 70%, or from about 40% to about 65%, or from about 40% to about 60%, or from about 40% to about 55%, or from about 40% to about 50%, or from about 40% to about 45%, or is at least 50% porous, or is at least 55% porous, or is at least 60% porous, or is at least 65% porous, or is at least 70% porous, or is at least 75% porous, or is at least 80% porous, or is at least 85% porous, or is at least 90% porous, or is at least 95% porous or is at least 97% porous.

Methods for making the metal-coated metal-coated perlite filler particles, can include, first making the metal-coated perlite filler particles. Then, the metal-coated perlite filler particles can be coated with a second metal. The first metal and second metal can be the same or different. In some embodiments, the metal-coated perlite filler particle can be made using a weighed amount of expanded perlite (commercially available as Norlite®, NorCal, Richmond Calif., USA; N50; density 4.5 to 6.6 (pounds per foot cubed), mesh size 24 to 100; and Fillite® commercially available from KELTECH Energies Ltd., India), which can be dispersed in a volume of organic diol, for example, 100 milliliter (mL) of ethylene glycol heated to within a temperature range of about 150 degrees Celsius to about 200 degrees Celsius, thereby forming a support mixture. The support mixture dispersion is then mixed with a measured amount (either in solid form or in solution form) of a metal salt solution, thereby forming a reaction mixture. The reaction mixture is then heated to within a temperature range from about 20 degrees Celsius to about 200 degrees Celsius, more preferably from about 160 degrees Celsius to about 180 degrees Celsius. Optionally, to get all of the porous filler particles wetted, an ultrasonicator can be placed in contact with the reaction mixture and pulsed one to five times at 35 to 50 kilohertz at 120 Watts power setting, e.g., Ultrasonic Systems, Bangalore, India.

The reaction mixture can be stirred in a vessel while maintaining the reaction mixture within a temperature range from 20 degrees Celsius to about 200 degrees Celsius, more preferably from about 160 degrees Celsius to about 180 degrees Celsius. The time required to heat the reaction mixture can vary, but the typical heating period generally ranges from 1 minute to 24 hours. Preferably, the heating period ranges from about 1 minute to about 5 hours, and more preferably, the heating period ranges from 1 minute to 1 hour. The metal cations in the reaction mixture are reduced by the organic diol to metal particles having a zero valence state. Once the majority of the metal cations have been reduced to metal on the porous filler particles and on the filler particle pore surfaces, the metal-coated filler samples can be taken out after about 15 minutes to about 1 hour. The metal-coated filler particles can be isolated from the liquid reactants by several known methods, including, washing and filtration, centrifugation, and sedimentation. The metal-coated filler particles can be recovered from the reaction mixture, for example, using a Büchner funnel having an appropriate filter attached to a vacuum source. Laboratory methods for recovering particles using a Büchner funnel include those described in Shapiro J, "High- Rate Laboratory Filtration with Büchner Funnels," Science (1961); 133(3467):1828-1829. In some embodiments, the filters used to capture the acicular high aspect ratio metallic particles having a first (x) dimension ranging from about 0.1 microns to about 10 microns and a second (y) dimension ranging from about 1 microns to about 100 microns are commercially available from Millipore, Billerica, Mass. and from Whatman Kent, UK. The solid metallic particles in embodiments of the present technology can be washed after separation from the precipitation mixture with water until the conductivity of the wash water is 20 micro-ohms or less. Optionally, the isolated metal-coated filler particles can be washed with an organic solvent such as a small chain alcohol. The water and/or solvent can then be removed from the metallic particles and the particles dried.

Once washed, the isolated metal-coated filler particles can be dried in an oven set to a temperature falling within a temperature range from about 40 degrees Celsius to about 150 degrees Celsius and dried in the preheated oven for a period of time ranging from about 1 hour to about 24 hours.

The concentration of the metal salt solution affects the resulting metal particle size coated on the perlite filler particles. It is preferable to produce smaller metal particle sizes that are substantially uniformly distributed throughout the entire surface available to the metal salt solution, including the particle surface and within the particle pores on the surfaces of the particle pores (also referred to herein as particle pore surfaces). Illustratively, embodiments of the present methods for making a metal-coated filler may employ a final concentration of metal salt solution in the reaction mixture which is in the range of about 0.01 Molarity to about 1 Molarity. The final concentrations of the organic diol in the reaction mixture range from about 1 Molarity to about 10 Molarity. In some embodiments, the mole ratio of organic diol to metallic salt solution can range from about 1 to 0.001. In some embodiments, a generalized reaction can include dispersing 4 grams of copper acetate in 100 milliliter of glycol (0.2 Molarity). The ratios of metallic salt solution to organic diol can be scaled up or down according to the amount of metal-coated filler particles needed.

As the surface area of the filler particles increases, a higher concentration of metal can be dispersed over the surface. For example, if silver is dispersed over perlite particles with a BET surface area of 50 meters squared per gram ($m^2/g$), approximately 67 percent of the surface is covered by a fully-dispersed monolayer of silver at a 5 percent silver loading. But if the support BET surface area is 200 $m^2/g$, at a 5 percent silver loading only about 17 percent of the surface is covered by a silver monolayer, and the approximately 67 percent surface coverage is not approached until the silver loading is at about 20 percent. In a preferred embodiment of the present technology, the BET surface area of the filler particles is from about 10 $m^2/g$ to about 2000 $m^2/g$. As used herein, the "BET surface area" refers to the surface area of a filler particle as determined by using the Brunauer, Emmett, Teller equation for multi molecular adsorption. For further details, explanations, and examples of use of the BET equation and its applications see Introduction to Colloid and Surface Chemistry, $2^{nd}$ Edition, D. J. Shaw, published by Butterworth (Publishers) Inc, 1978. The porous filler particles can have a surface area calculated using the BET method that ranges from about 10 to about 2000 $m^2/g$, more preferably, the porous filler particles can have a surface area ranging from about 200 to 1500 $m^2/g$, and most preferably from about 300 to about 1500 $m^2/g$.

In various embodiments, the metal salt solution preferably has a concentration of the metal cation in the presence of the organic diol sufficient to yield a metal loading on the porous perlite filler particles which ranges from about 500 percent weight of the metal to 100 percent weight of the porous filler particles to about 100 percent weight of the metal to 100 percent weight of the porous filler particles. In other words, the total weight of the metal particles on the final metal-coated metal-coated perlite filler particles in relation to the total weight of the perlite filler particles can range from about 5 to 1 to about 1 to 1. The metal loadings of the metal particles on the metal-coated metal-coated perlite filler particles can range from about 100 to about 500 weight percent, or from about 100 to about 400 weight percent, or from about 100 to about 300 weight percent, or from about 100 to about 200 weight percent, or from about 150 to about 400 weight percent, or from about 200 to about 400 weight percent, or from about 250 to about 500 weight percent, or from about 300 to about 500 weight percent, or from about 350 to about 500 weight percent metal to 100 weight percent of the filler particle.

In some embodiments, a second metal from the exemplary list provided above (e.g., silver or a corrosion inhibiting metal, etc.) can be coated on a metal-coated filler originally coated with the same or different metal as described above. In some embodiments, the metal-coated metal-coated perlite particles can include one or more of: silver-coated copper-coated perlite particles, nickel-coated copper-coated perlite particles, cobalt-coated copper-coated perlite particles, aluminum-coated copper-coated perlite particles, iron-coated copper-coated perlite particles, gold-coated copper-coated perlite particles, platinum-coated copper-coated perlite particles, palladium-coated copper-coated perlite particles, cobalt-coated copper-coated perlite particles, zinc-coated copper-coated perlite particles, or combinations thereof.

The method for making a multi-metal-coated filler includes the steps of mixing a solution of an organic diol with a plurality of metal-coated filler particles coated with a first metal to obtain a support mixture; adding a metal salt solution having a different metal cation to the first metal coated on the metal-coated filler particles with the support mixture forming a reaction mixture; and heating the reaction mixture to a temperature within a temperature range from 50 degrees Celsius to 200 degrees Celsius, whereby the metal cations in the metal salt solution are reduced to metal particles and are disposed on the surface and the pore surfaces of the metal-coated filler particles.

In some embodiments, the metal-coated filler can be coated with a second metal in an aqueous medium, for example, after a first metal, for example, copper has been deposited on to perlite filler particles and isolated, silver can be coated on the copper coated perlite filler particles. This involves a reduction of the metal, for example, silver from the metal salt, for example silver nitrate, using sodium potassium tartrate as a reducing agent onto the surface of the first metal-coated perlite filler. Silver coated copper particles made in accordance with the present technology are illustratively shown in Examples 2-5 herein below. The particle size of the metal-coated metal-coated perlite can range from about 10 microns to about 500 microns, preferable from about 50 microns to about 200 microns.

Secondary Fillers

In some embodiments, the moldable thermally-conductive thermoplastic composite materials also contain a quantity of secondary fillers. While a number of secondary fillers are described for illustrative purposes, it is to be understood, that any thermally-conductive filler material can be used with the at least one metal-coated filler described above. Illustrative and non-limiting examples of secondary filler particles include: carbon fiber, graphite, nano-graphite platelets, carbon nanotubes, carbon black, boron nitride, silicon nitride, aluminum nitride, aluminum oxide, magnesium oxide, and combinations thereof. While there is no specific particle size requirement, it is preferred that the particle size of the secondary filler range from about 1 micron to about 300 microns, or from about 1 micron to about 200 microns, and preferably from about 20 microns to about 100 microns. Prior to use, in an exemplary embodiment, the secondary fillers can be dried in a forced air oven at about 150 degrees Celsius for about 6 hours and then kept at 50 degrees Celsius before mixing with polymer matrix and metal-coated filler.

The amount of secondary filler particles if incorporated into the thermally-conductive thermoplastic composite can range, from about 1% to about 50%, or from about 1% to about 40%, or from about 1% to about 30%, or from about 1% to about 20%, or from about 1% to about 10%, or from about 5% to about 40%, or from about 10% to about 40% or from about 15% to about 40%, or from about 20% to about 40%, or from about 25% to about 40%, or from about 30% to about 40%, or from about 35% to about 40% by volume/volume of the total composite. In some embodiments, the amount of secondary filler particles if incorporated into the moldable thermally-conductive thermoplastic composite can range, from about 20% to about 50% by volume (v/v) of the total composite.

Carbon Fiber

In some embodiments, the moldable thermally-conductive thermoplastic composite can include carbon fiber as secondary filler. The carbon fiber can be used in many different configurations. For example, in non-limiting illustrative examples, the carbon fiber can be made from a plurality of filament threads which are essentially a bundle of many thousand carbon filaments. A single such carbon filament is a thin tube with a diameter of 1 to 30 microns and consists almost exclusively of carbon. Depending upon the precursor to make the fiber, carbon fiber may be turbostratic or graphitic, or have a hybrid structure with both graphitic and turbostratic parts present. In turbostratic carbon fiber the sheets of carbon atoms are haphazardly folded, or crumpled, together. Carbon fibers derived from polyacrylonitrile (PAN) are turbostratic, whereas carbon fibers derived from mesophase pitch are graphitic after heat treatment at temperatures exceeding 2200 Celsius. Turbostratic carbon fibers tend to have high tensile strength, whereas heat-treated mesophase-pitch-derived carbon fibers have high Young's modulus and high thermal conductivity. The carbon fiber used in the thermally-conductive filler may have a diameter ranging from about 1 to about 30 microns or from about 1 to about 20 microns. In some illustrative examples of carbon fibers include: T300, T300J, T400H, T600S, T700S, T700 G and AS4 which can have diameters ranging from 1 to 10 microns, IM6 can have diameters that are approximately 5 microns. Commercially available carbon fibers useful as secondary filler are provided by Toray Carbon Fibers North America, (Decatur, Ala., USA).

Boron Nitride

The polymer system of the present invention can include secondary filler including boron nitride filler. Examples of thermally-conductive boron nitride fillers suitable for use in the present invention include fine particles of boron nitride with hexagonal crystal structure. The polymer system comprises at least 60%, preferably at least 65%, and more preferably at least 70% by weight boron nitride filler. Mixture of such materials of substantially uniform or varied size may also be utilized. Specifically, for certain applications, preferably, about 10 to 40% by volume of the particles display an average particle size of about 5 to about 25 microns, and about 60 to 90% by volume of the particles display an average particle size of about 40 to about 80 microns. In total, the filler displays an average particle size of at least about 50 microns. The particle morphology of the fillers is also important. Examples of fillers suitable for the present intention are boron nitride materials sold under the trade designations PolarTherm PT110 (surface area of 0.1-1 meters squared per gram ($m^2$/g), particle size of 35-60 microns) and PolarTherm PT120 (surface area of 0.5-5 $m^2$/gm, particle size of 8-14 microns) by Advanced Ceramic of Cleveland, (Cleveland, Ohio, USA).

Graphite

Graphite is a layered material. Individual molecular layers are held together with weak Van der Waals forces which are capable of intercalation with organic or inorganic molecules and eventual expansion. Graphite is a useful secondary filler in the present technology due to the fact that graphite is stable to 3000° C., does not melt, has a high thermal conductivity (ranging from about 100 Watts per meter Kelvin to about 1000 Watts per meter Kelvin); has a low coefficient of thermal expansion, and has excellent thermal shock resistance. Moldable thermally-conductive thermoplastic composites having graphite provides good electrical conductivity, is self-lubricating and is not wet by most molten metals or ceramics. Other advantages of graphite can include non-reactive with most chemicals and its strength increases with temperature, making this secondary filler material ideal for use in heat sinks and the like. The graphite powders and flakes can have an aspect ratio of at least 50, 100, 1000, 10,000, or higher. The surface area of the nano graphite platelets can be 50 meters squared per gram ($m^2$/g), 75 $m^2$/g, 100 $m^2$/g, r larger.

Commercial sources of graphite powders and flakes having dimensions less than 100 microns in any of X and Y and Z dimensions include Oxeeco Technologies Private Limited, Hyderabad, India. Any commercially available source of graphite powders can be used in the compositions and methods of the present technology. An example of such commercially available graphite powder can illustratively include Graphite CVG from Asbury Graphite Mills Inc; (Asbury, N.J., USA) which has a density of 2.2 g/cc (grams centimeter cubed). The size distribution can range from about 180 microns to about 850 microns.

Nano Graphite Platelets

Nano graphite platelets useful in embodiments of the present technology can be made using expanded graphite as a precursor material. Expanded graphite provides superior mechanical properties and in addition provides electrical properties if a sufficient amount are present in a thermally-conductive thermoplastic composite. Expanded graphite platelets have interbasal plane surfaces which have reactive sites on the edges of the platelets. Different chemical groups can be added to the edges. The application of an electric field can be used to orient the expanded graphite platelets in a preferred direction creating materials which are electrically or thermally-conductive in one direction. Submicron conductive paths can be created to act as nanosized wires. As used herein, an expanded graphite is one which has been heated to separate individual platelets of graphite. An exfoliated graphite is a form of expanded graphite where the individual platelets are separated by heating.

The expanded graphite usually does not have any significant order as evidenced by an x-ray diffraction pattern. There are several methods for producing nano graphite platelets for use in the present technology. The use of microwave energy or radiofrequency induction heating provides a fast and economical method to produce expanded graphite nanoflakes, graphite nanosheets, or graphite nanoparticles. The combination of radiofrequency or microwave expansion and appropriate grinding technique, such as for instance by ball milling, mechanical grinding, air milling, or ultrasonic wave treatment to produces nano graphite platelet flakes with a high aspect ratio efficiently. The pulverized nano graphite platelet can have an aspect ratio of 100, 1000, 10,000, or higher. The surface area of the nano graphite platelets can be 50 meters squared per gram ($m^2/g$), 75 $m^2/g$, or 100 $m^2/g$ or larger. Single nano graphite platelets can have a length less than about 300 microns and a thickness of less than about 0.1 microns (preferably with a thickness less than about 20 nanometers, and more preferably less than about 15 nanometers). Nano graphite platelets useful in the present technology are commercially available from. In an exemplary embodiment of the present technology, nano graphite pellets commercially available as xGnP from XG Sciences Inc.; (East Lansing, Mich., USA) can be utilized in the moldable thermally-conductive thermoplastic composite of the present technology. The reported thermal conductivity of grapheme is about 3000 Watts per meter-Kelvin.

Carbon Nanotubes

A carbon nanotube has a tubular shape of one-dimensional nature which is obtained by rolling one or more graphene sheets composed of six-membered rings of carbon atoms into a tube. A carbon nanotube that is formed from one graphene sheet is called a single-wall nanotube (SWNT) while a carbon nanotube that is formed from graphene sheet layers is called a multi-wall nanotube (MWNT). Single-wall nanotubes are about 1 nanometer (nm) in diameter whereas multi-wall carbon nanotubes measure several tens nm in diameter, and both are far thinner than their predecessors, which are called carbon fibers. Carbon nanotubes, according to embodiments of the present invention, can be made by any known technique (e.g., arc method, laser oven, chemical vapor deposition, flames, HiPco, etc.) and can be in a variety of forms, e.g., soot, powder, fibers, "bucky papers," etc. Such carbon nanotubes include, but are not limited to, single-wall carbon nanotubes, multi-wall carbon nanotubes, double-wall carbon nanotubes, buckytubes, fullerene tubes, carbon fibrils, carbon nanotubules, stacked cones, horns, carbon nanofibers, vapor-grown carbon fibers, and combination thereof.

Carbon nanotubes may comprise a variety of lengths, diameters, chiralities (helicities), number of walls, and they may be either open or capped at their ends. Furthermore, they may be chemically functionalized in a variety of manners. These could include semiconducting (bandgaps .about 0.1 to 2 electron volts eV), semimetallic (bandgaps 0.001-0.01 eV) or metallic carbon nanotubes (bandgaps about 0 eV), and more particularly mixtures of the three types. Carbon nanotubes of the present technology can also be physically modified by techniques including, but not limited to, physisorption, plasma treatment, radiation treatment, heat treatment, pressure treatment, and combinations thereof. Illustrative examples of carbon nanotubes which can be used in the present technology can include carbon nanotubes commercially available from Nanoarmor, (Houston, Tex., USA). Exemplary carbon nanotubes can have a core diameter of about 7 nm with length varying from about 1 micron to about 50 microns, or from about 2 microns to about 30 microns, or from about 5 microns to about 15 microns. The carbon nanotubes can have a density of about 2.1 $g/cm^3$. In some embodiments, a commercially available carbon nanotube, aligned multi wall carbon nanotubes (A-MWNT) (purity greater than 90%, 91%, 92%, 93%, 94% or greater than 95%, and having an outer diameter (OD) or external diameter ranging from about 1-20 nm, length ranging from 1-20 microns, having a specific surface area ranging from 30-400 $m^2/g$ and a thermal conductivity ranging from about 2000 to about 3000 Watts per meter Kelvin.) Commercially available carbon nanotubes useful in the present technology can include MicroTechNano A-MWNT (Indianapolis, Ind., USA), Carbon Black Carbon black [C.A.S. NO. 1333-86-4] is virtually pure elemental carbon in the form of colloidal particles that are produced by incomplete combustion or thermal decomposition of gaseous or liquid hydrocarbons under controlled conditions. Its physical appearance is that of a black, finely divided pellet or powder. Carbon black is not soot or black carbon, which are the two most common, generic terms applied to various unwanted carbonaceous by-products resulting from the incomplete combustion of carbon-containing materials, such as oil, fuel oils or gasoline, coal, paper, rubber, plastics and waste material. Carbon black is chemically and physically distinct from soot and black carbon, with most types containing greater than 97% elemental carbon arranged as aciniform (grape-like cluster) particulate. Carbon black useful in the thermally-conductive moldable thermoplastic composites of embodiments of the present technology is commercially available, for example, Ketjenblack® EC-600, Ketjenblack® EC-600JD Ketjenblack® EC-300 and Ketjenblack® EC-300JD all from Akzo-Nobel, Amersfoort, The Netherlands. Carbon blacks useful in the compositions and methods of the present technology can have a surface area of more than 800 $m^2/gm$.

Aluminum Nitride

Aluminum nitride (AlN) is a ceramic material possessing outstanding properties such as high thermal conductivity, low electrical resistivity and high hardness. Aluminum nitride is a (mostly) covalently bonded material, and has a hexagonal crystal structure called the wurtzite crystal structure. Aluminum nitride is synthesized by the carbothermal reduction of alumina or by direct nitridation of aluminum. The use of sintering aids and hot pressing is required to produce a dense technical grade material. The space group for this structure is $P6_{3mc}$. Unblended aluminum nitride offers excellent thermal conductivity performance, e.g. 140-180 Watts per meter Kelvin. Commercially available sources of aluminum nitride powders having a particle size ranging from 3 microns to about 100 microns can include Accumet Materials Co. Ossining, N.Y., USA. Aluminum nitride particles can be used from commercially available sources with a size range of 10-20 nm.

Polymer Matrix

In various embodiments, the present moldable thermally-conductive thermoplastic composite can be injection molded and formed into complex geometries, shapes, and configurations. The moldable thermally-conductive thermoplastic composite combines the metal-coated filler particles, secondary particles, and can be mixed intimately within a polymer matrix. The polymer matrix can include one or more solid, liquid or semi solid forms; for example, one or more resins are used to form a continuous polymeric matrix into which the other components are uniformly dispersed. The particulate metal-coated filler and secondary fillers can be randomly dispersed into the continuous polymer matrix as further described hereinafter.

The polymer matrix material can include any one or more of the following polymer matrices: acrylonitrile butadiene styrene (ABS) (chemical formula $(C_8H_8.C_4H_6.C_3H_3N)_n$); polycarbonate/acrylonitrile butadiene styrene alloys (PC-ABS); polybutylene terephthalate; polyphenylene oxide; polyphenelene sulfide (PPS); polyphenylene ether; modified polyphenylene ether containing polystyrene; liquid crystal polymers; polystyrene; styrene-acrylonitrile copolymer; rubber-reinforced polystyrene; poly ether ether ketone (PEEK); acrylic resins such as polymers and copolymers of alkyl esters of acrylic and methacrylic acid; styrene-methyl methacrylate copolymer; styrene-methyl methacrylate-butadiene copolymer; polymethyl methacrylate; methyl methacrylate-styrene copolymer; polyvinyl acetate; polysulfone; polyether sulfone; polyether imide; polyarylate; polyamideimide; polyvinyl chloride; vinyl chloride-ethylene copolymer; vinyl chloride-vinyl acetate copolymer; polyimides, polyamides; polyolefins such as polyethylene; ultra high molecular weight polyethylene; high density polyethylene; linear low density polyethylene; polyethylene napthalate; polyethylene terephthalate; polypropylene; chlorinated polyethylene; ethylene acrylic acid copolymers; polyamides, for example, nylon 6, nylon 6,6, and the like; phenylene oxide resins; phenylene sulfide resins; polyoxymethylenes; polyesters; polyvinyl chloride; vinylidene chloride/vinyl chloride resins; and vinyl aromatic resins such as polystyrene; poly(vinylnaphthalene); and poly(vinyltoluene); polyimides; polyaryletheretherketone; polyphthalamide; polyetheretherketones; polyaryletherketone and combinations thereof.

Although any of these polymer matrices or combinations of polymer matrices above is suitable herein, the particular choice of polymer matrix material may depend somewhat on the particular requirements of the application for which the thermally-conductive thermoplastic composite is to be used. For example, properties such as impact resistance, tensile strength, operating temperature, heat distortion temperature, barrier characteristics, and the like are all affected by the choice of polymer matrix material. It is generally preferable to use a thermoplastic material, due to greater ease in preparing and molding the composite.

Polyphenylene Sulfide

The polyphenylene sulfide polymer is typically formed by reaction of sulfide with p-dichlorobenzene. Commercially available polyphenylene sulfide can be found at Ticona Corporation, Kelsterbach Germany a subsidiary company Celanese AG under the trademark Fortron® PSS polymers and Ryton polyphenylene sulfide polymer by Chevron Phillips, Houston, Tex., USA. In some embodiments, Fortron 0205 B4 polyphenylene sulfide from Ticona Engineering Polymers with a density of 1.4 g/cm3 can be used in the formulation of the moldable thermally-conductive thermoplastic composite.

Liquid-Crystal Polymers

The term "liquid-crystal polymer" used in various embodiments of the present technology is intended to mean a melt-processable polymer having such properties that the polymer molecular chains are regularly arranged parallel to each other in a molten state. Liquid-crystal polymers (LCPs) are a class of materials that combine the properties of polymers with those of liquid crystals. These "hybrids" show the same mesophases characteristic of ordinary liquid crystals, yet retain many of the useful and versatile properties of polymers. The state in which molecules are arranged in this way is often called a liquid-crystal state or a nematic phase of a liquid-crystal material. Such polymer molecules are generally slender and flat and have substantial rigidity along the major axis of the molecule and a plurality of chain-lengthening bonds which are usually in either a coaxial relationship or a parallel relationship with each other. In order for normally flexible polymers to display liquid crystal characteristics, rod-like or disk-like elements (called mesogens) must be incorporated into their chains. The placement of the mesogens plays a large role in determining the type of LCP that is formed. Main-chain liquid crystal polymers or MC-LCPs are formed when the mesogens are themselves part of the main chain of a polymer. Conversely, side chain liquid crystal polymers or SC-LCPs are formed when the mesogens are connected as side chains to the polymer by a flexible "bridge" (called the spacer.) Other factors influencing the mesomorphic behavior of polymers include the presence of long flexible spacers, a low molecular weight, and regular alternation of rigid and flexible units along the main chain. Suitable examples of liquid crystal polymers can include one or more of the Vectra® type of liquid crystal polymers such as A115, A130, A230, A430, A435, A625, A700, A725 and A950 which are commercially available from Ticona Engineering Polymers, Kelsterbach, Germany.

Polyamides

In some embodiments, the polymer matrix material can include one or more polyamide thermoplastic polymer matrices. A polyamide polymer is a polymer containing an amide bond (—NHCO—) in the main chain and capable of being heat-melted at temperatures less than about 300 degrees Celsius. Specific examples of the polyamide resin include polycaproamide (nylon 6), polytetramethylene adipamide (nylon 46), polyhexamethylene adipamide (nylon 66), polyhexamethylene sebacamide (nylon 610), polyhexamethylene dodecamide (nylon 612), polyundecamethylene adipamide (nylon 116), polyundecanamide (nylon 11), polydodecanamide (nylon 12), polytrimethylhexamethylene terephthalamide (nylon TMHT), polyhexamethylene isophthalamide (nylon 61), polyhexamethylene terephthal/isophthalamide (nylon 6T/61), polynonamethylene terephthalamide (nylon 9T), polybis(4-aminocyclohexyl)methane dodecamide (nylon PACM12), polybis(3-methyl-4-aminocyclohexyl)methane dodecamide (nylon dimethyl PACM12), polymethaxylylene adipamide (nylon MXD6), polyundecamethylene terephthalamide (nylon 11T), polyundecamethylene hexahydroterephthalamide (nylon 11T(H)) and their copolymerized polyamides and mixed polyamides. Among these, nylon 6, nylon 46, nylon 66, nylon 11, nylon 12, nylon 9T, nylon MXD6, and their copolymerized polyamides and mixed polyamides are preferable in terms of availability, handleability and the like. Nylon 6, nylon 46, nylon 66 and nylon MXD6 are more preferable in terms of strength, modulus of elasticity, cost and the like.

The volume of polymer matrix in the final moldable thermally-conductive thermoplastic composite by percent volume (v/v) can range from about 10% to about 40%, or from about 10% to about 35%, or from about 10% to about 30%, or from about 10% to about 25%, or from about 10% to about 20%, or from about 10% to about 15%, or from about 15% to about 40%, or from about 20% to about 40%, or from about 25% to about 40%, or from about 30% to about 35%, or from about 35% to about 40%.

Methods Of Making The Moldable Thermally-Conductive Thermoplastic Composite

The polymer matrix together with one or more metal-coated filler particles can be combined with a secondary filler and blended and intimately mixed using conventional mixing techniques or processed in several different ways such as, melt blending, solution blending, or the like, or combinations including at least one of the foregoing methods of blending. Melt blending of the moldable thermally-conductive thermoplastic composite involves the use of shear force, extensional force, compressive force, ultrasonic energy, electromagnetic energy, thermal energy or combinations comprising at least one of the foregoing forces or forms of energy and is conducted in processing equipment wherein the aforementioned forces or forms of energy are exerted by a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations comprising at least one of the foregoing.

Melt blending involving the aforementioned forces may be conducted in machines such as single or multiple screw extruders, Buss kneader, Henschel, helicones, Ross mixer, Banbury, roll mills, molding machines such as injection molding machines, vacuum forming machines, blow molding machine, or the like, or combinations comprising at least one of the foregoing machines.

In one embodiment, particles of metal-coated filler (either one or both of metal-coated filler particles and/or silver coated graphite) and the polymer matrix in powder form, in pellet form, sheet form, or the like, may be first dry blended with a secondary filler material, for example, carbon fiber and/or boron nitride in a Henschel or in a roll mill, prior to being fed into a melt blending device such as an extruder or Buss kneader. It may be desirable to introduce one or more secondary fillers into the melt blending device in the form of a masterbatch. In such a process, the masterbatch may be introduced into the melt blending device downstream of the point where the polymer matrix is introduced.

A melt blend is one where at least a portion of the polymer matrix has reached a temperature greater than or equal to about the melting temperature, if the resin is a semi-crystalline polymer matrix, or the flow point (e.g., the glass transition temperature) if the resin is an amorphous resin during the blending process. A dry blend is one where the entire mass of the polymer matrix is at a temperature less than or equal to about the melting temperature if the resin is a semi-crystalline polymer matrix, or at a temperature less than or equal to the flow point if the polymer matrix is an amorphous resin and wherein polymer matrix is substantially free of any liquid-like fluid during the blending process. A solution blend, as defined herein, is one where the polymer matrix is suspended in a liquid-like fluid such as, for example, a solvent or a non-solvent during the blending process.

In another exemplary embodiment, the polymer matrix together with one or more metal-coated filler particles can be intimately mixed by grinding, stirring, milling, or tumbling. The moldable thermally-conductive thermoplastic composite comprising one or more metal-coated filler particles, polymer matrix, and one or more secondary fillers may be subject to multiple blending and forming steps if desirable. For example, the moldable composition may first be extruded and formed into pellets. The pellets may then be fed into a molding machine where it may be formed into any desirable shape or product. Alternatively, the moldable composition emanating from a single melt blender may be formed into sheets or strands and subjected to post-extrusion processes such as annealing, uniaxial or biaxial orientation.

Solution blending may also be used to manufacture the moldable thermally-conductive thermoplastic composite. The solution blending may also use additional energy such as shear, compression, ultrasonic vibration, or the like, to promote homogenization of the metal-coated filler particles, secondary particles with the polymer matrix. In some embodiments, the polymer matrix can be suspended in a fluid and can be introduced into an ultrasonic sonicator along with the metal-coated filler particles and/or secondary particles. The mixture may be solution blended by sonication for a time period effective to disperse the metal-coated filler particles, and/or secondary particles onto the polymer matrix particles. The polymer matrix along with the metal-coated filler particles and/or secondary particles may then be dried, extruded, and molded if desired. It is generally desirable for the fluid to swell the polymer matrix during the process of sonication. Swelling the polymer matrix generally improves the ability of metal-coated filler particles and/or secondary particles to impregnate the polymer matrix during the solution blending process and consequently improves dispersion. The moldable thermally-conductive thermoplastic composite displays advantageous melt flow properties. In one embodiment, the moldable thermoplastic composite has a melt flow index of about 1 to about 30 grams per 10 minutes when measured at a temperature of 280 degrees Celsius under a load of 16 kilogram-force per square centimeter (kg-f/cm$^2$). An exemplary melt flow index for the thermoplastic composite is about 4 to about 20 grams per 10 minutes when measured at a temperature of 280° C. under a load of 16 kg-f/cm$^2$.

In one embodiment, the moldable thermally-conductive thermoplastic composite comprises a random distribution of metal-coated filler particles and/or secondary particles and has a thermal conductivity of greater than 20 Watts per meter-Kelvin (W/m·K). In another embodiment, the thermoplastic composite generally has a thermal conductivity of about 20 to about 35 Watts per meter-Kelvin. Within this range, it is generally desirable for the moldable composition to have a thermal conductivity greater than or equal to about 20 Watts per meter-Kelvin, specifically greater or equal to about 25 Watts per meter-Kelvin, more specifically greater than or equal to about 35 Watts per meter-Kelvin.

As used herein in the various embodiments of the present technology, the moldable thermally-conductive thermoplastic composites provided herein can be formulated for injection molding applications. Injection molding techniques are known in the art. Several illustrative injection molding techniques useful in embodiments of the present technology for making desired parts and components can include injection molding techniques such as co-injection (sandwich) molding, fusible (lost, soluble) core injection molding, gas-assisted injection molding, in-mold decoration and in mold lamination, injection-compression molding, insert and outset molding, lamellar (microlayer) injection molding, low-pressure injection molding, microinjection molding, microcellular molding, multicomponent injection molding (overmolding), multiple live-feed injection molding, powder injection molding, push-pull injection molding, reaction injection molding, resin transfer molding, rheomolding, structural foam injection molding, structural reaction injection molding, thin-wall molding, vibration gas injection molding, and water assisted injection molding.

Exemplary, non-limiting moldable thermally-conductive thermoplastic composite for use in injection molding manufacturing processes are provided in the Examples provided herein below.

Methods For Using The Thermally-conductive Thermoplastic Composites

Embodiments of the present technology may be used in a variety of electroconductive applications (e.g., using highly thermally-conductive injection moldable thermoplastic composite applications, etc.), such as for interconnects, circuit boards, manufacture of semiconductor devices, radio frequency identification, printed and flexible circuits, etc.

By way of example, a description will now be provided of some exemplary thermal applications in which the moldable thermally-conductive thermoplastic composite may be used. As a first example, an injection moldable thermally-conductive thermoplastic composite that includes: a metal-coated filler, a secondary filler and a polymer matrix may be used for light emitting diode (LED) thermal management, such as with LEDs associated with home lighting, automotive tail lamps, displays and sign boards, etc. LEDs typically generate 75% to 85% of the power into heat. But excess heat directly affects LED performance. Thus, the use of an injection moldable thermally-conductive polymer composite that includes a metal-coated filler may allow for lower operating temperatures, which, in turn, leads to longer operating life time for the LED. Continuing with this example, the injection moldable thermally-conductive polymer composite that includes a metal-coated filler, a secondary filler and a polymer matrix may be configured to satisfy the following specifications: thermal conductivity greater than 20 Watts per meter Kelvin, thermal stability of about 60 to 120 degrees Celsius, a coefficient of thermal expansion less than $5\times10^{-6}$/K at 200 degrees Celsius, and a Underwriters Laboratory (UL) Flammability rating of V0 or V1.

Another example use of an injection moldable thermally-conductive polymer composite that includes a metal-coated filler, a secondary filler and a polymer matrix relates to thermal conductivity and/or EMI shielding for DVD pick-up trays, such as, with blue ray applications, home appliances, optical storage, etc. With DVD pick-up trays, convection cooling is not typically possible due to the high temperature of the DVD laser, and there are also space constraints due to miniaturization. In this example, an injection moldable thermally-conductive polymer composite that includes a metal-coated filler, a secondary filler and a polymer matrix may be configured to satisfy the following specifications: thermal conductivity greater than 20 Watts per meter Kelvin, thermal stability of about 120 degrees Celsius, a modulus of 7 gigapascals, and a UL Flammability rating of V0 or V1.

Another example application relates to high thermally-conductive plastic trays for freeze drying or ice dispensers, such as with consumer and industrial applications, healthcare, home appliances, etc. Gas assisted cooling may be inefficient with such trays, and it may also be relatively difficult to injection mold the complex parts associated with such trays. In this example, an injection moldable thermally-conductive polymer composite that includes a metal-coated filler, a secondary filler and a polymer matrix may be configured to satisfy the following specifications, for example, to provide a electrically/thermally-conductive eco-friendly composite: thermal conductivity greater than 20 Watts per meter Kelvin, thermal stability at negative 80 degrees Celsius, class A surface, good weatherability, UL Flammability rating of V0 or V1, and ultraviolet stability.

A further example application relates to thermally-conductive plastic encapsulents/covers for motors/compressors, such as with consumer and industrial applications, electrical and electronics applications, etc. Typically, covers for motors/compressors may be difficult to injection mold due to relatively complex parts. In this example, an injection moldable thermally-conductive polymer composite that includes a metal-coated filler, a secondary filler and a polymer matrix may be configured to satisfy the following specifications, for example, to offer light weight and in-build molding: thermal conductivity greater than 20 Watts per meter Kelvin, thermal stability of about 100 degrees Celsius, class A surface, good weatherability, a modulus of 7 gigapascals, and a UL Flammability rating of V0 or V1.

Micro electronics, optoelectronics and micro electrical mechanical systems (MEMS) packaging is another example application in which may be used an injection moldable thermally-conductive polymer composite that includes a metal-coated filler, a secondary filler and a polymer matrix. Due to miniaturization, thermal management of very small electronic devices is critical for performance of such electronic devices. In this example, an injection moldable thermally-conductive polymer composite that includes a metal-coated filler, a secondary filler and a polymer matrix may be configured to satisfy the following specifications: thermal conductivity greater than 20 Watts per meter Kelvin, thermal stability of about 60 degrees Celsius, a coefficient of thermal expansion less than $5\times10^{-6}$/K at 200 degrees Celsius, and a UL Flammability rating of V0 or V1.

Power electronics (e.g., aerospace, power and energy, automotive applications, etc.) is another example application in which may be used an injection moldable thermally-conductive polymer composite that includes a metal-coated filler, a secondary filler and a polymer matrix. Thermal management of high power devices is relatively important in order to minimize or at least reduce the device losses. In this example, an injection moldable thermally-conductive polymer composite that includes a metal-coated filler, a secondary filler and a polymer matrix may be configured to satisfy the following specifications, for example, to offer high thermal conductivity with thermal stability and good manufacturability: thermal conductivity greater than 20 Watts per meter Kelvin, thermal stability of about 200 degrees Celsius, a coefficient of thermal expansion less than $5\times10^{-6}$/K at 200 degrees Celsius, and a UL Flammability rating of V0 or V1.

Another application relates to injection moldable heat exchangers (e.g., cross-flow heat exchangers, etc.), such as for use in electronics, industrial, power and energy applications, etc. Heat exchangers oftentimes are relatively complex metal structures that may be made by metal injection molding and laser sintering. In this example, an injection moldable thermally-conductive polymer composite that includes a metal-coated filler, a secondary filler and a polymer matrix may be configured to satisfy the following specifications, for example, to offer high thermal conductivity with thermal stability and manufacturability into complex shapes (e.g., helix, etc.): thermal conductivity greater than 20 Watts per meter Kelvin, thermal stability of about 200 degrees Celsius, chemical resistance, dimensional stability, and a UL Flammability rating of V0 or V1.

A further example application relates to encapsulated/covered power supplies with high thermal conductivity molded inserts, such as for use in electronics, industrial, power and energy applications, etc. Metal panels tend to be relatively heavy and are often difficult to make into complex parts. With power supplies, electrical insulators are typically needed for isolations. In this example, an injection moldable thermally-conductive polymer composite that includes a metal-coated filler, a secondary filler and a polymer matrix may be configured to satisfy the following specifications, for example, to offer large panels with insulation and insert molding with metal components: thermal conductivity greater than 20 Watts per meter Kelvin, modulus greater than 7 gigapascals, and a UL Flammability rating of V0 or V1.

Another thermally-conductive example relates to radiator components, such as for use with industrial and automotive applications. Metal panels tend to be heavy and are often difficult to make into complex parts. Plus, conventional fan cooling systems not particularly efficient or effective. In this example, an injection moldable thermally-conductive polymer composite that includes a metal-coated filler, a secondary filler and a polymer matrix may be configured to satisfy the following specifications, for example, to offer light weight and high cooling efficiency: thermal conductivity greater than 20 Watts per meter Kelvin, modulus greater than 7 gigapascals, weatherability, chemical resistance, and a UL Flammability rating of V0 or V1.

An additional example relates to electric car conversion kits and components, such as for use with industrial and automotive applications. In this example, an injection moldable thermally-conductive polymer composite that includes a metal-coated filler, a secondary filler and a polymer matrix may be configured to satisfy the following specifications, for example, to offer lighter weights, lower costs, and/or easier to mold complex parts: thermal conductivity greater than 20 Watts per meter Kelvin, modulus greater than 7 gigapascals, weatherability, Class A surface, chemical resistance, and a UL Flammability rating of V0 or V1.

A further application relates to thermally-conductive polymer based diesel pumps, such as for use with automotive and industrial applications. Diesel fuel pumps may need thermally-conductive plastic/metal to help fuel flowing in sub-freezing temperatures. In this example, an injection moldable thermally-conductive polymer composite that includes a metal-coated filler, a secondary filler and a polymer matrix may be configured to satisfy the following specifications, for example, to offer high thermal stability with thermal conductivity and relatively easy to mold parts: thermal conductivity greater than 20 Watts per meter Kelvin, modulus greater than 7 gigapascals, weatherability, chemical resistance, and a UL Flammability rating of V0 or V1.

Another application relates to radiant heating, such as with home/office construction and structural glazing. A radiant heating system may need a thermally-conductive composite in order to uniformly heat the floor/walls. In this example, an injection moldable thermally-conductive polymer composite that includes a metal-coated filler, a secondary filler and a polymer matrix may be configured to satisfy the following specifications, for example, to offer relatively uniform heat transfer: thermal conductivity greater than 20 Watts per meter Kelvin, modulus greater than 7 gigapascals, Class A surface, wear resistance, and a UL Flammability rating of V0 or V1.

An additional example relates to heat sinks, such as for use with electrical, electronics, power and energy applications. Heat sinks are often associated with complex integrated and/or flexible structures. In this example, an injection moldable thermally-conductive polymer composite that includes a metal-coated filler, a secondary filler and a polymer matrix may be configured to satisfy the following specifications, for example, to offer injection moldable complex structures: thermal conductivity greater than 20 Watts per meter Kelvin, modulus greater than 7 gigapascals, thermal stability of about 40 to 100 degrees Celsius, chemical resistance, and a UL Flammability rating of V0 or V1.

Another application relates to automotive head/tail lamps reflectors or interior and exterior lighting. High power lamps may generate a lot of heat, and metal-coated plastic may be unable to meet the thermal needs for such high power lamps. In this example, an injection moldable thermally-conductive polymer composite that includes a metal-coated filler, a secondary filler and a polymer matrix may be configured to satisfy the following specifications, for example, to offer injection moldable structures that are relatively fast cooling: thermal conductivity greater than 20 Watts per meter Kelvin, modulus greater than 7 gigapascals, thermal stability of about 150 degrees Celsius, weatherability, and a UL Flammability rating of V0 or V1.

EXAMPLES

For the following six example, the thermal conductivity measurements were performed using a Hot Disk Thermal Constants Analyser, for example, The Hot Disk TPS 2500 S, TPS 1500, TPS 4500 and TPS 2500 DUAL which are platform instruments for determination of thermal transport properties in materials. These thermal conductivity measurement devices are commercially available from The Hot Disk® AB Co., Gothenburg, Sweden. Methods for determining the thermal conductivity of the composites can be derived from the manufacturer's instructions. The measurements were performed at room temperature using a slab module method. This method is intended for studies of medium to high thermal conductive materials. Typical sample dimensions were circular discs of 2 mm thickness and 75 mm diameter.

Example 1

Moldable Thermally-Conductive Thermoplastic Composite Formulation No. 1

TABLE 1

Formulation and Thermal Conductive Properties of Compression Molded Thermally-conductive Thermoplastic Compositions Example 1.

| Composition | Vol. %(v/v) | Thermal Conductivity Watts per meter Kelvin |
|---|---|---|
| Liquid Crystal Polymer Vectra ® 950 (Ticona Ticona Engineering Polymers) | 30 | 33.1 |
| Silver Coated Graphite (15% silver coated TC-300 graphite (Asbury) | 50 | |
| Carbon Fiber (ThermalGraph DKD X, from Cytec Carbon Fibers) | 20 | |

Example 2

Moldable Thermally-Conductive Thermoplastic Composite Formulation No. 2

TABLE 2

Formulation and Thermal Conductive Properties of Compression Molded Thermally-Conductive Thermoplastic Compositions Example 2.

| Composition | Vol. %(v/v) | Thermal Conductivity Watts per meter Kelvin |
|---|---|---|
| Liquid Crystal Polymer (Vectra ® 950 Ticona) | 34.64 | 11.0 |
| Boron Nitride (PT360) (Momentive Performance Materials) | 36.31 | |

TABLE 2-continued

Formulation and Thermal Conductive Properties of Compression Molded Thermally-Conductive Thermoplastic Compositions Example 2.

| Composition | Vol. %(v/v) | Thermal Conductivity Watts per meter Kelvin |
|---|---|---|
| Silver Coated Copper Coated Perlite | 18.15 | |
| Carbon Fiber (ThermalGraph DKD X, from Cytec Carbon Fibers Cytec) | 10.89 | |

Example 3

Moldable Thermally-Conductive Thermoplastic Composite Formulation No. 3

TABLE 3

Formulation and Thermal Conductive Properties of Compression Molded Thermally-Conductive Thermoplastic Compositions Example 3.

| Composition | Vol. %(v/v) | Thermal Conductivity Watts per meter Kelvin |
|---|---|---|
| Liquid Crystal Polymer (Vectra ® 950 Ticona Ticona Engineering Polymers) | 24 | 30.3 |
| Silver Coated Graphite (15% silver coated TC-300 graphite (Asbury) | 50 | |
| Silver Coated Copper Coated Perlite | 26 | |

Example 4

Moldable Thermally-Conductive Thermoplastic Composite Formulation No. 4

TABLE 4

Formulation and Thermal Conductive Properties of Compression Molded Thermally-Conductive Thermoplastic Compositions Example 4.

| Composition | Vol. %(v/v) | Thermal Conductivity Watts per meter Kelvin |
|---|---|---|
| Liquid Crystal Polymer (Vectra ® 950 Ticona Engineering Polymers) | 24 | 16.65 |
| Boron Nitride (PT360) (Momentive Performance Materials) | 32 | |
| Silver Coated Copper Coated Perlite | 32 | |
| Carbon Fiber (ThermalGraph DKD X, from Cytec Carbon Fibers) | 12 | |

Example No. 5

Moldable Thermally-Conductive Thermoplastic Composite Formulation No. 5

TABLE 5

Formulation and Thermal Conductive Properties of Compression Molded Thermally-Conductive Thermoplastic Compositions Example 5.

| Composition | Vol. %(v/v) | Thermal Conductivity Watts per meter Kelvin |
|---|---|---|
| Polyphenylene Sulfide (Fortron 0205 B4 PPS Ticona Engineering Polymers) | 24 | 26.22 |
| Carbon Fiber (ThermalGraph DKD X, from Cytec Carbon Fibers) | 38 | |
| Silver Coated Copper Coated Perlite | 38 | |

Example No. 6

Moldable Thermally-Conductive Thermoplastic Composite Formulation No. 6

TABLE 6

Formulation and Thermal Conductive Properties of Injection Molded Thermally-Conductive Thermoplastic Compositions Example 6.

| Composition | Vol. %(v/v) | Thermal Conductivity Watts per meter Kelvin |
|---|---|---|
| Liquid Crystal Polymer (Vectra ® 950 Ticona Engineering Polymers) | 40 | 25.8 |
| Silver Coated Graphite (15% silver coated TC-300 graphite (Asbury) | 40 | |
| Silver Coated Copper Coated Perlite | 20 | |

Example No. 7

Moldable Thermally-Conductive Thermoplastic Composite Formulation No. 7

TABLE 7

Formulation and Thermal Conductive Properties of Injection Molded Thermally-Conductive Thermoplastic Compositions Example 7.

| Composition | Vol. %(v/v) | Thermal Conductivity Watts per meter Kelvin |
|---|---|---|
| Liquid Crystal Polymer (Vectra ® 950 Ticona Engineering Polymers) | 30 | 30.55 |
| Silver Coated Graphite (15% silver coated TC-300 graphite (Asbury) | 70 | |

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A moldable thermally-conductive thermoplastic composition comprising:
    a plurality of metal-coated filler particles; and
    a polymer matrix in admixture with the metal-coated filler particles,
    wherein the amount of metal-coated filler particles is at least about 50% volume of the total composition.

2. The moldable thermally-conductive thermoplastic composition of claim 1, wherein the plurality of metal-coated filler particles comprise one or more of:
    metal-coated graphite particles; and/or
    metal-coated perlite particles having one or more metal coatings; and/or combinations thereof.

3. The moldable thermally-conductive thermoplastic composition of claim 1, wherein the plurality of metal-coated filler particles comprise perlite particles having a first metal coating and a second metal coating that is the same metal or a different metal than the first metal coating.

4. The moldable thermally-conductive thermoplastic composition of claim 1, wherein the plurality of metal-coated filler particles comprise one or more of silver-coated graphite particles, silver-coated copper-coated perlite particles, nickel-coated copper-coated perlite particles, cobalt-coated copper-coated perlite particles, aluminum-coated copper-coated perlite particles, iron-coated copper-coated perlite particles, gold-coated copper-coated perlite particles, platinum-coated copper-coated perlite particles, palladium-coated copper-coated perlite particles, zinc-coated copper-coated perlite particles, or combinations thereof.

5. The moldable thermally-conductive thermoplastic composition of claim 1, wherein:
    the plurality of metal-coated filler particles comprise one or more metal coatings of one or more of gold, silver, nickel, zinc, palladium, platinum, copper, iron, cobalt, aluminum, or combinations thereof; and/or
    the plurality of metal-coated filler particles comprise metal-coated perlite particles having a porosity ranging from 40% to about 99% or from about 80% to about 90%.

6. The moldable thermally-conductive thermoplastic composition of claim 1, wherein the moldable thermally-conductive thermoplastic composition further includes secondary filler particles, such that the amount of the metal-coated filler particles and the secondary filler particles combined range from about 40% to about 80% or from about 50% to about 70% of the total thermoplastic composition by volume.

7. The moldable thermally-conductive thermoplastic composition of claim 1, further including a plurality of secondary filler particles, wherein the plurality of secondary filler particles comprises one or more of carbon fiber, boron nitride, graphite, nano graphite platelets, carbon nanotubes, carbon black, aluminum nitride, silicon nitride, aluminum oxide, magnesium oxide, or combinations thereof.

8. The moldable thermally-conductive thermoplastic composition of claim 1, wherein the composition has a thermal conductivity ranging from about 10 Watts per meter-Kelvin to about 35 Watts per meter-Kelvin or from about 20 Watts per meter-Kelvin to about 35 Watts per meter-Kelvin, and the composition is formulated for injection molding applications.

9. The moldable thermally-conductive thermoplastic composition of claim 1, wherein the polymer matrix comprises one or more of acrylonitrile butadiene styrene (ABS) (chemical formula $(C_8H_8.C_4H_6.C_3H_3N)_n$); polycarbonate/acrylonitrile butadiene styrene alloys (PC-ABS); polybutylene terephthalate; polyphenylene oxide; polyphenylene sulfide (PPS); polyphenylene ether; modified polyphenylene ether containing polystyrene; liquid crystal polymers; polystyrene; styrene-acrylonitrile copolymer; rubber-reinforced polystyrene; poly ether ether ketone (PEEK); acrylic resins such as polymers and copolymers of alkyl esters of acrylic and methacrylic acid; styrene-methyl methacrylate copolymer; styrene-methyl methacrylate-butadiene copolymer; polymethyl methacrylate; methyl methacrylate-styrene copolymer; polyvinyl acetate; polysulfone; polyether sulfone; polyether imide; polyarylate; polyamideimide; polyvinyl chloride; vinyl chloride-ethylene copolymer; vinyl chloride-vinyl acetate copolymer; polyimides, polyamides; polyolefins such as polyethylene; ultra high molecular weight polyethylene; high density polyethylene; linear low density polyethylene; polyethylene napthalate; polyethylene terephthalate; polypropylene; chlorinated polyethylene; ethylene acrylic acid copolymers; polyamides, nylon, nylon 6, nylon 6,6,; phenylene oxide resins; phenylene sulfide resins; polyoxymethylenes; polyesters; polyvinyl chloride; vinylidene chloride/vinyl chloride resins; and vinyl aromatic resins such as polystyrene, poly(vinylnaphthalene), and poly(vinyltoluene); polyimides; polyaryletheretherketone; polyphthalamide; polyetheretherketones; polyaryletherketone; polycarbonate; polyphenylene; or combinations thereof.

10. A moldable thermally-conductive thermoplastic composition of claim 1, wherein:
    the plurality of metal-coated filler particles are silver-coated graphite, the moldable thermally-conductive thermoplastic composition further includes a plurality of secondary filler particles that are carbon fiber, and the polymer matrix is liquid crystal polymer; or
    the plurality of metal-coated filler particles are silver-coated copper-coated perlite, the moldable thermally-conductive thermoplastic composition further includes a plurality of secondary filler particles that are boron nitride and carbon fiber, and the polymer matrix is liquid crystal polymer; or
    the plurality of metal-coated filler particles are silver-coated graphite and silver-coated perlite and the polymer matrix is liquid crystal polymer; or
    the plurality of metal-coated filler particles are silver-coated copper-coated perlite, the moldable thermally-conductive thermoplastic composition further includes a plurality of secondary filler particles that are boron nitride and carbon fiber, and the polymer matrix is liquid crystal polymer; or
    the plurality of metal-coated filler particles are silver-coated copper-coated perlite, the moldable thermally-conductive thermoplastic composition further includes a plurality of secondary filler particles that are carbon fiber, and the polymer matrix is polyphenylene sulfide; or
    the plurality of metal-coated filler particles are silver-coated graphite and silver-coated copper-coated perlite, and the polymer matrix is liquid crystal polymer; or
    the plurality of metal-coated filler particles are silver-coated graphite and the polymer matrix is liquid crystal polymer.

11. An article comprising the moldable thermally-conductive thermoplastic composition of claim 1.

12. A moldable thermally-conductive thermoplastic composition comprising a polymer matrix admixed with metal containing filler particles including one or more of graphite, perlite, and combinations thereof at least partially coated with metal, the moldable thermally-conductive thermoplastic composition having a thermal conductivity greater than 10 Watts per meter-Kelvin Kelvin and formulated for injection molding applications.

13. The moldable thermally-conductive thermoplastic composition of claim 12, wherein:
   the metal containing filler particles comprise perlite particles having a first metal coating and a second metal coating that is the same metal or a different metal than the first metal coating; and/or
   the metal containing filler particles comprise perlite particles at least partially coated with one or more of gold, silver, nickel, zinc, palladium, platinum, copper, iron, cobalt, and aluminum; and/or
   the metal containing filler particles comprise metal-coated perlite particles having a porosity ranging from 40% to about 99% or from 80% to about 99%; and/or
   the metal containing filler particles comprise perlite particles having first and second metal coatings, and wherein the weight of the metal particles of the first and second metal coatings ranges from about 100% to about 400% of the weight of the perlite particles; and/or
   the metal containing filler particles comprise perlite particles having a first copper coating and a second silver coating.

14. The moldable thermally-conductive thermoplastic composition of claim 12, wherein the polymer matrix comprises one or more of acrylonitrile butadiene styrene (ABS) (chemical formula $(C_8H_8.C_4H_6.C_3H_3N)_n$); polycarbonate/acrylonitrile butadiene styrene alloys (PC-ABS); polybutylene terephthalate; polyphenylene oxide; polyphenylene sulfide (PPS); polyphenylene ether; modified polyphenylene ether containing polystyrene; liquid crystal polymers; polystyrene; styrene-acrylonitrile copolymer; rubber-reinforced polystyrene; poly ether ether ketone (PEEK); acrylic resins such as polymers and copolymers of alkyl esters of acrylic and methacrylic acid; styrene-methyl methacrylate copolymer; styrene-methyl methacrylate-butadiene copolymer; polymethyl methacrylate; methyl methacrylate-styrene copolymer; polyvinyl acetate; polysulfone; polyether sulfone; polyether imide; polyarylate; polyamideimide; polyvinyl chloride; vinyl chloride-ethylene copolymer; vinyl chloride-vinyl acetate copolymer; polyimides, polyamides; polyolefins such as polyethylene; ultra high molecular weight polyethylene; high density polyethylene; linear low density polyethylene; polyethylene napthalate; polyethylene terephthalate; polypropylene; chlorinated polyethylene; ethylene acrylic acid copolymers; polyamides, nylon, nylon 6, nylon 6,6,; phenylene oxide resins; phenylene sulfide resins; polyoxymethylenes; polyesters; polyvinyl chloride; vinylidene chloride/vinyl chloride resins; and vinyl aromatic resins such as polystyrene, poly(vinylnaphthalene), and poly(vinyltoluene); polyimides; polyaryletheretherketone; polyphthalamide; polyetheretherketones; polyaryletherketone; polycarbonate; polyphenylene; or combinations thereof.

15. The moldable thermally-conductive thermoplastic composition of claim 12, wherein:
   the moldable thermally-conductive thermoplastic composition has a polymer matrix volume less than 40% by volume; and/or
   the moldable thermally-conductive thermoplastic composition has a polymer matrix volume varying from about 20% to about 40% by volume and an amount of metal containing filler particles ranging from about 40% to about 70%, the composition balanced to 100% volume with secondary filler particles, said composition having a thermal conductivity ranging from about 20 Watts per meter-Kelvin to about 35 Watts per meter-Kelvin; and/or
   the moldable thermally-conductive thermoplastic composition further comprises secondary filler particles including one or more of carbon fiber, boron nitride, graphite, nano graphite pellets, carbon nanotubes, carbon black, aluminum nitride, and combinations thereof.

16. An article comprising the moldable thermally-conductive thermoplastic composition of claim 12.

17. A method of producing a moldable thermally-conductive thermoplastic composition comprising a plurality of metal-coated filler particles and a polymer matrix in admixture with the metal-coated filler particles and having a thermal conductivity of at least 10 Watts per meter Kelvin, the method comprising mixing the metal-coated filler particles in the polymer matrix such that the amount of metal-coated filler particles is at least about 50% volume of the total composition.

18. The method of claim 17, wherein mixing comprises melt blending and/or solution blending.

19. The method of claim 17, wherein:
   the metal-coated filler particles comprise one or more of metal-coated graphite particles, metal-coated perlite particles having one or more metal coatings, silver-coated copper-coated perlite particles, silver-coated graphite particles, or combinations thereof; and/or
   the method includes mixing secondary filler particles in the polymer matrix, wherein the secondary filler particles comprise one or more of carbon fiber, boron nitride, and/or combinations thereof.

20. The moldable thermally-conductive thermoplastic composition of claim 1, wherein the plurality of metal-coated filler particles comprise graphite particles and perlite particles at least partially coated with metal.

21. The moldable thermally-conductive thermoplastic composition of claim 1, wherein the plurality of metal-coated filler particles comprise silver-coated copper-coated perlite particles.

22. The moldable thermally-conductive thermoplastic composition of claim 1, wherein the total amount of metal-coated filler particles is between 50% and 80% by volume of the total composition.

23. The moldable thermally-conductive thermoplastic composition of claim 1, wherein the plurality of metal-coated filler particles comprise graphite particles at least partially coated with metal in an amount ranging from about 5% to about 80% by volume, and an amount of perlite particles at least partially coated with metal such that the total amount of metal-coated filler particles is between about 50% and about 80% by volume of the total composition.

24. The moldable thermally-conductive thermoplastic composition of claim 1, wherein the plurality of metal-coated filler particles comprise perlite particles and silver dispersed over the perlite particles with approximately 67 percent or less surface coverage of the perlite particles by the silver.

25. The moldable thermally-conductive thermoplastic composition of claim 12, wherein the metal containing filler particles comprise graphite particles and perlite particles at least partially coated with metal.

26. The moldable thermally-conductive thermoplastic composition of claim 12, wherein the metal containing filler particles comprise silver-coated copper-coated perlite particles.

27. The moldable thermally-conductive thermoplastic composition of claim 12, wherein the total amount of metal containing filler particles is at least about 50% by volume of the total composition.

* * * * *